United States Patent
Nguyen et al.

(10) Patent No.: US 9,141,681 B2
(45) Date of Patent: Sep. 22, 2015

(54) CREATING A COLUMN FAMILY IN A DATABASE

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 13/688,698

(22) Filed: Nov. 29, 2012

(65) Prior Publication Data

US 2014/0149452 A1    May 29, 2014

(51) Int. Cl.
*G06F 17/30* (2006.01)
(52) U.S. Cl.
CPC .... *G06F 17/30575* (2013.01); *G06F 17/30566* (2013.01); *G06F 17/30578* (2013.01)
(58) Field of Classification Search
CPC ............... G06F 17/30578; G06F 17/30575; G06F 17/30566; G06F 17/30563
USPC .......... 707/756, 713, 798, 693, 609, 769, 602
See application file for complete search history.

(56) References Cited

U.S. PATENT DOCUMENTS

| | | | | |
|---|---|---|---|---|
| 8,321,390 | B2 * | 11/2012 | Swarnakar | 707/696 |
| 8,626,778 | B2 * | 1/2014 | Wilkes et al. | 707/756 |
| 2009/0276577 | A1 * | 11/2009 | Bell | 711/137 |
| 2010/0318498 | A1 * | 12/2010 | Swarnakar | 707/693 |
| 2012/0109935 | A1 * | 5/2012 | Meijer | 707/713 |
| 2012/0110428 | A1 * | 5/2012 | Meijer | 715/219 |
| 2012/0330908 | A1 * | 12/2012 | Stowe et al. | 707/693 |
| 2013/0007007 | A1 * | 1/2013 | Pan et al. | 707/747 |
| 2013/0212131 | A1 * | 8/2013 | Reddy | 707/798 |
| 2013/0339293 | A1 * | 12/2013 | Witten et al. | 707/609 |
| 2014/0040182 | A1 * | 2/2014 | Gilder et al. | 707/602 |

* cited by examiner

*Primary Examiner* — Jean M Corrielus
(74) *Attorney, Agent, or Firm* — Lowenstein Sandler LLP (57) ABSTRACT

A mechanism for providing messages for Java message service (JMS). A method includes receiving, by a Java message service (JMS) server executed by a processing device, key-value data pair. The key-value data pair is sent by a client. The method also includes extracting, by the processing device, destination information of a JMS message from the value data of the key-value data pair. The destination information is either a JMS queue or a JMS topic. The method further includes storing, by the processing device, the key-value data pair in a column family of not only structured query language (NoSQL) database when one of the JMS queue or the JMS topic associated with the received key-value data pair exists in the column family of the NoSQL database. The column family includes a plurality of stored key-value data pairs.

19 Claims, 8 Drawing Sheets

CREATING A COLUMN FAMILY IN A DATABASE

TECHNICAL FIELD

The embodiments of the disclosure relate generally to a computer system and, more specifically, relate to systems and methods for providing messages for Java message service.

BACKGROUND

Messaging is a method of communication between software components or applications. A messaging system provides for the communication such that a messaging client can send messages to, and receive messages from, any other client. Each client connects to a messaging agent that provides facilities for creating, sending, receiving, and reading messages.

Many messaging systems exist as part of a set of published enterprise-wide standards known as Enterprise Messaging System (EMS). EMS systems are a set of published enterprise-wide standards that allows organizations to send messages between computer systems. An example of a specific application programming interface (API) that implements an EMS system is the Java message service (JMS). JMS allows applications to create, send, receive, and read messages.

The messaging systems that are created in the EMS system are very complex as the developers not only have to cope with the Enterprise standards but also create a stable, scalable and low maintenance messaging system. Although JMS is an API, it encounters many similar issues as those involved in setting up a full EMS.

BRIEF DESCRIPTION OF THE DRAWINGS

The disclosure is understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure provide for systems and methods for providing messages to a Java message service (JMS). A method of embodiments of the disclosure includes receiving, by a Java message service (JMS) server executed by a processing device, key-value data pair. key-value data pair is sent by a client. The method also includes extracting, by the processing device, destination information of a JMS message from the value data of the key-value data pair. The destination information is either a JMS queue or a JMS topic. The method further includes storing, by the processing device, the key-value data pair in a column family of not only structured query language (NoSQL) database when one of the JMS queue or the JMS topic associated with the received key-value data pair exists in the column family of the NoSQL database. The column family includes a plurality of stored key-value data pairs.

In one embodiment, a method of the disclosure includes receiving a request to retrieve the key-value data pair associated with the JMS queue from the JMS server. The request sent to the JMS server from the client. The method also includes retrieving the key-value data pair associated with the JMS queue. The the key-value data pair associated with the JMS queue is retrieved from the column family of the NoSQL database.

In another embodiment, a method of the disclosure includes receiving a request to subscribe to the JMS topic from the JMS server. The request is sent to the JMS server from the client. The method further includes creating a column family of the key-value data pairs in the NoSQL database. The column family includes the JMS topic for the client subscribed to the JMS topic.

In a further embodiment, a a second key-value data pair associated with the JMS topic is received from the JMS server. In other embodiments, the second key-value data pair is replicated in the column family of the NoSQL database subscribing to the JMS topic.

Figure 1:
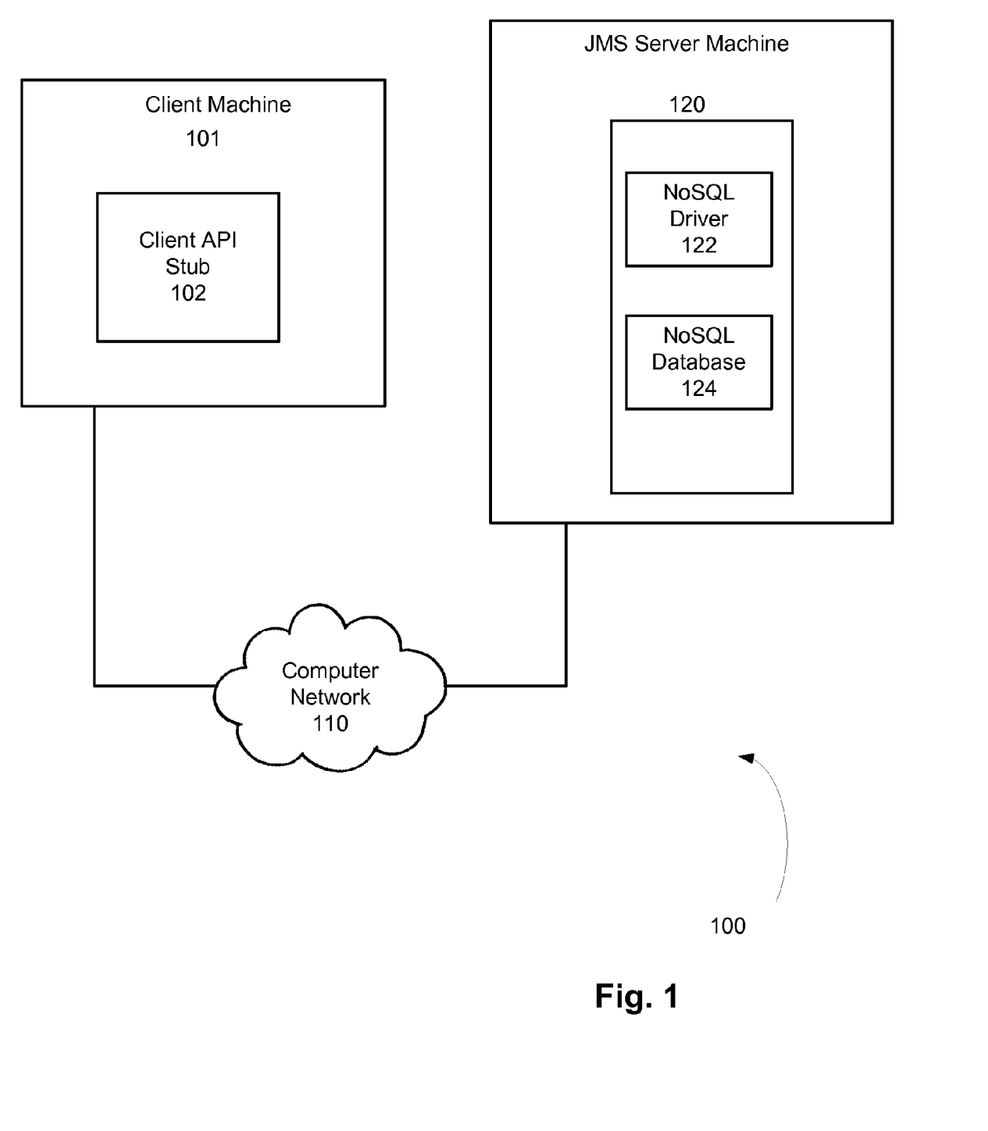
FIG. 1 is a block diagram of a computer system in which the embodiments of the present disclosure may operate.

FIG. 1 is a block diagram that illustrates a network architecture 100 in which embodiments of the disclosure may operate. Network architecture 100 includes a client machine 101 ("client") and a Java message service (JMS) server machine ("JMS server") 120 and a not only structured query language (NoSQL) database 124. The client 101 may be any variety of different computing devices including, but not limited to, a laptop computer, a handheld computer, a netbook, a desktop, a workstation, a mobile device such as smart phone, a server device, or any other type of computing device. Network architecture 100 may include any number of clients 101 that communicate over the network 110 with any number of JMS servers 120.

A single client 101 and a single JMS sever 120 are illustrated and described for sake of clarity; however embodiments of the disclosure are not limited to such a depiction. Network 110 may be any type of communication network including, but not limited to, a local area network (LAN), a wide area network (WAN) (e.g., the Internet,) or similar communications network. The network 110 can include any number of network devices and computing devices that are in communication over any combination of wired and wireless communication lines.

In one embodiment, client 101 is a JMS client that functions to receive or generate a JMS message. In one embodiment, a JMS message is an object that contains the data being transferred between JMS clients. The JMS message may include, but is not limited to, text message, bytes message, stream message, object message, map message, and so on.

JMS server 120 may be any type of computing device including a server device, a plurality of server devices, or similar computing device. The network architecture 100 may include any number of JMS servers 120 that communicate over the network 110 with any number of clients 101. The JMS server 120 may hosts a NoSQL driver 122 and a NoSQL database 124. In some embodiments, the NoSQL database 124 may reside in a separate server machine than the JMS server machine 120.

In one embodiment, the client 101 executes a set of applications (not shown). A 'set,' as used herein, refers to any positive whole number of items including a single item. The applications may be any computer-executable program capable of communicating with a server of the JMS server 120. In one embodiment, the application is a client applicant processing interface (API) stub 102. A stub in distributed computing is a piece of code used for converting parameters passed during a Remote Procedure Call (RPC). The RPC functions to allow a local computer (client) to remotely call procedures on a remote computer (server). Client API stub 102 functions to convert the JMS message into a key-value data pair form. In some embodiments, the client API stub 102 sends the key-value data pair to the JMS server 120 as an ordinary storage request. As such, the client is not aware of the fact that the JMS message is being stored as the the key-value data pair into the NoSQL database 124.

The key data of the key-value data pair may include timestamp information of the JMS message. In one embodiment, the key data represents the time when the JMS message was received by the client 101. In another embodiment, the key data represents the time when the JMS message was generated by the client 101. In one embodiment, the key-value data pairs are stored in the column family of the NoSQL database 124 based on the key data such that the JMS message with the oldest timestamp is initially stored followed by the JMS message having the timestamp immediately after the oldest timestamp until the JMS message with the newest timestamp.

The value data of the key-value data pair may include destination information of the JMS message. In one embodiment, the destination is a JMS queue. The JMS queue is a data construct that stages messages that have been sent and are waiting to be read. In one embodiment, the JMS queue supports a one-to-one messaging model, such as point to point messaging. In another embodiment, the destination is a JMS topic. The JMS topic may be a distribution mechanism for publish/subscribe messaging for publishing JMS messages to a particular message topic that are delivered to multiple subscribers.

In one embodiment, the NoSQL driver 122 functions to receive the key-value data pair from the client API stub 102. In some embodiments the key-value data pair is received as ordinary NoSQL storage request. The NoSQL driver 122 may extract the destination information from the value data of the key-value data pair. As discussed above, the destination is either a JMS queue or JMS topic associated with the key-value data pair.

In other embodiments, the NoSQL driver 122 searches the NoSQL database 124 for either the JMS queue or the JMS topic associated with the received key-value data pair. The NoSQL database 124 stores a column family of plurality of key-value data pairs. In some embodiments, if either the JMS queue or the JMS topic associated with the received key-value data pair exists in the stored plurality of the key-value data pairs in the NoSQL database 124, then the NoSQL driver 122 stores the received key-value data pair with the corresponding stored key-value data pairs in the column family of the NoSQL database 124. As such, the key-value data pairs are grouped based on the destination information of either the JMS queue or the JMS topic.

In other embodiments, if either of the JMS queue or the JMS topic associated with the received key-value data pair does not exist in the plurality of the key-value data pairs in the NoSQL database 124, then a column family is created for the received key-value data pair. In one embodiment for the JMS queue as the destination in the received key-value data pair, the NoSQL driver 122 creates a column family for the JMS queue in the NoSQL database 124 and stores the received key-value data pair in the column family of the NoSQL database 124.

In another embodiment for the JMS topic as the destination in the received key-value data pair, the NoSQL driver 122 creates a number of column families of the key-value data pairs for the JMS topic in the NoSQL database 122. In one embodiment, the NoSQL driver 122 creates the number of column families based on number of clients as subscribers to the JMS topic, As such, for each client as subscriber to the JMS topic, a column family is created for the JMS topic. In further embodiment, the NoSQL driver 122 replicates the received key-value data pair for each of the column families and stores the replicated key-value data pairs in each of the column families. In one embodiment, the column families are created when the clients subscribe to the JMS topic.

In some embodiments, the client stub 102 of the client 101 requests to the JMS sever 120 to retrieve key-value data pair associated with the JMS queue. The client API stub 102 functions to receive the key-value data pair associated with the JMS queue from the JMS server 120. In one embodiment, the client API stub 102 receives the key-value data pair associated with the JMS queue upon request. In some embodiments, the client stub 102 converts the retrieved key-value data pair associated with the JMS queue to the JMS message associated with the JMS queue for the client 101. In other embodiment, the client API stub 102 subscribes, via the JMS server 120, to the JMS topic associated with a key-value data pair. In some embodiments, the client stub 102 converts the retrieved key-value data pair associated with the JMS topic to the JMS message associated with the JMS topic for the client 101.

In one embodiment, the NoSQL driver 122 receives a request from the client API stub 102 to retrieve key-value data pair associated with the JMS queue. Such key-value data pair associated with JMS queue may exist in the column families of the key-value data pairs in the NoSQL database 124. In some embodiments, the NoSQL driver 122 functions to retrieve the key-value data pairs from the JMS queue stored in the NoSQL database 124.

In another embodiment, the NoSQL driver 122 receives a request from the client API stub 102 to subscribe to the JMS topic associated with the key-value data pair. As discussed above, the JMS topic represents publish/subscribe messaging for publishing JMS messages to a particular message topic that are delivered to multiple subscribers. Such key-value data pair associated with JMS topic may exist in the column families of the key-value data pairs in the NoSQL database 124. In some embodiments, the NoSQL driver 122 creates column families of the key-value data pairs in the NoSQL database 124 for the JMS topic based on the number of clients as subscribers to the JMS topic. As such, for each client subscribed to the JMS topic, a column family is created for the JMS topic.

In other embodiments a new JMS message in the form of new key-value data pair is received from the client API stub 102. In one embodiment, upon receipt of new key-value data pair related to the JMS topic, the NoSQL driver 122 replicates the new key-value data pair for all each of the column families subscribed to the JMS topic. In some embodiments, the NoSQL driver 122 automatically sends the replicated key-value data pairs to the clients 101 in the column families subscribed to the JMS topic.

Figure 2A:
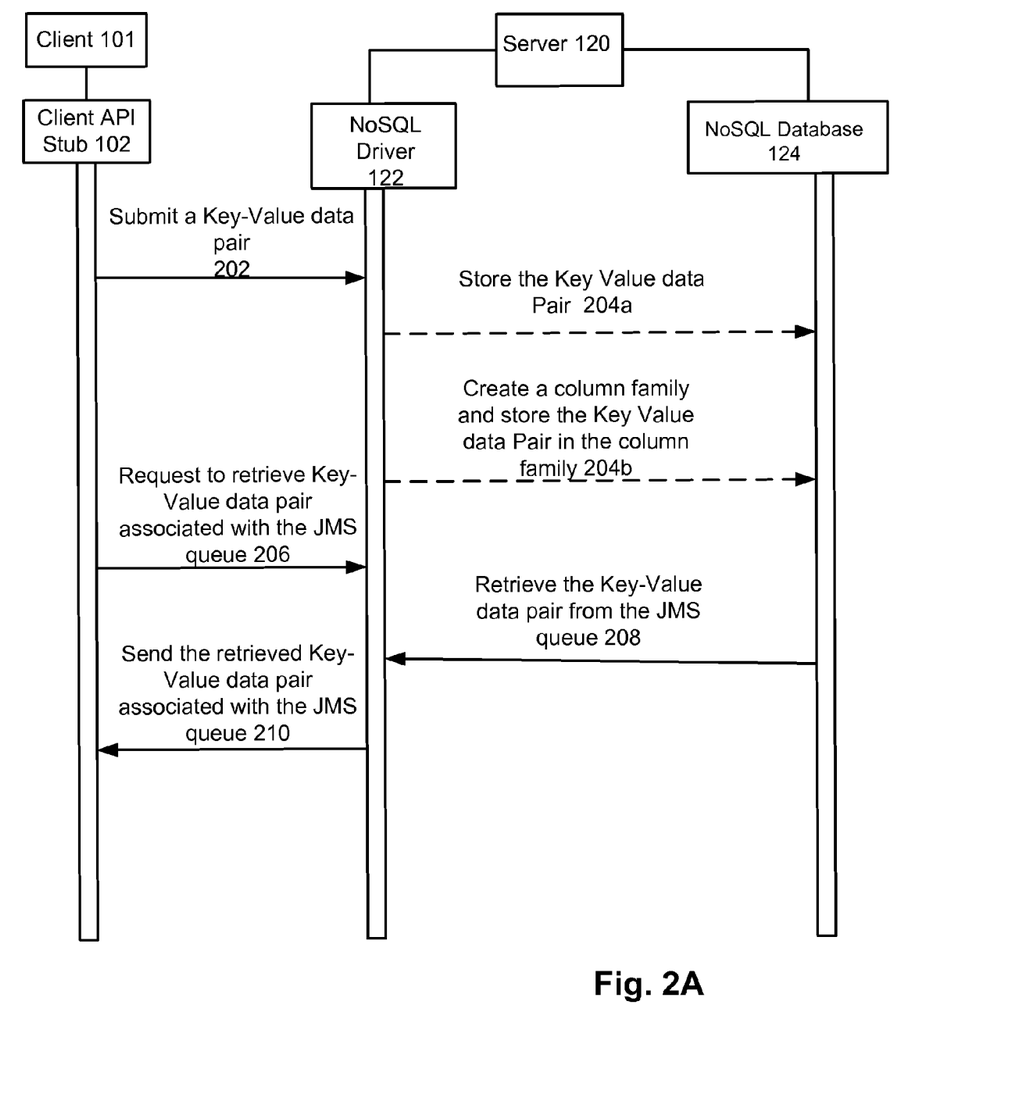
FIG. 2A illustrates an example of interactions between a client, and a Java server in accordance with some embodiments.

FIG. 2A is a communication flow diagram depicting interactions between a client 101 and the JMS sever 120 according to an embodiment of the disclosure. In one embodiment, the client 101 and the JMS server 120 are the same machines as described with respect to FIG. 1.

In one embodiment, the client API stub 102 of the client 101 converts a JMS message into a key-value data pair and submits 202 a key-value data pair to the NoSQL driver 122 of the JMS server 120 as an ordinary storage request. As discussed above, the key data of the key-value data pair includes the timestamp information of the JMS message, and the value data of the key-value data pair is the destination information of the JMS message. In one embodiment, the destination is a JMS queue of the JMS server 120. In another embodiment, the destination is a JMS topic associated with the JMS message and maintained by the JMS server 120. In some embodiments, the JMS message is generated by the client 101. In other embodiments, the JMS message is received by the client 101.

The NoSQL driver 122 extracts the destination information from the value data of the received key-value data pair and searches the NoSQL database 124 to determine if either a JMS queue or a JMS topic associated with the received key-value data pair exists in the stored plurality of the key-value data pairs in column family of the NoSQL database 124. The NoSQL driver 122 stores 204a the received key-value pair with the corresponding stored key-value data pairs in the column family of the NoSQL database 124 if either the JMS queue or the JMS topic associated with the received key-value data pair exists in the stored plurality of the key-value data pairs in the NoSQL database 124. The NoSQL driver 122 creates 204b a column family and stores the received key-value data pair in the column family if either the JMS queue or the JMS topic of the received key-value data pair does not exist in the NoSQL database 124. In another embodiment, the client API stub 102 of the client 101 sends a request 206 to retrieve a key value data pair associated with the JMS queue to the NoSQL driver 122 of the JMS server 120. In some embodiments, the NoSQL driver 122 searches for the key-value data pair associated with the JMS queue stored in column families of the key-value data pairs in the NoSQL database 124. The NoSQL driver 122 retrieves 208 the key-value data pair from the JMS queue The NoSQL driver 122 sends 210 the retrieved key-value data pair associated with the JMS queue to the client stub 102 of the client 101. The client stub 102 converts the retrieved key-value data pair associated with the JMS queue to the JMS message for the client 101.

Figure 2B:
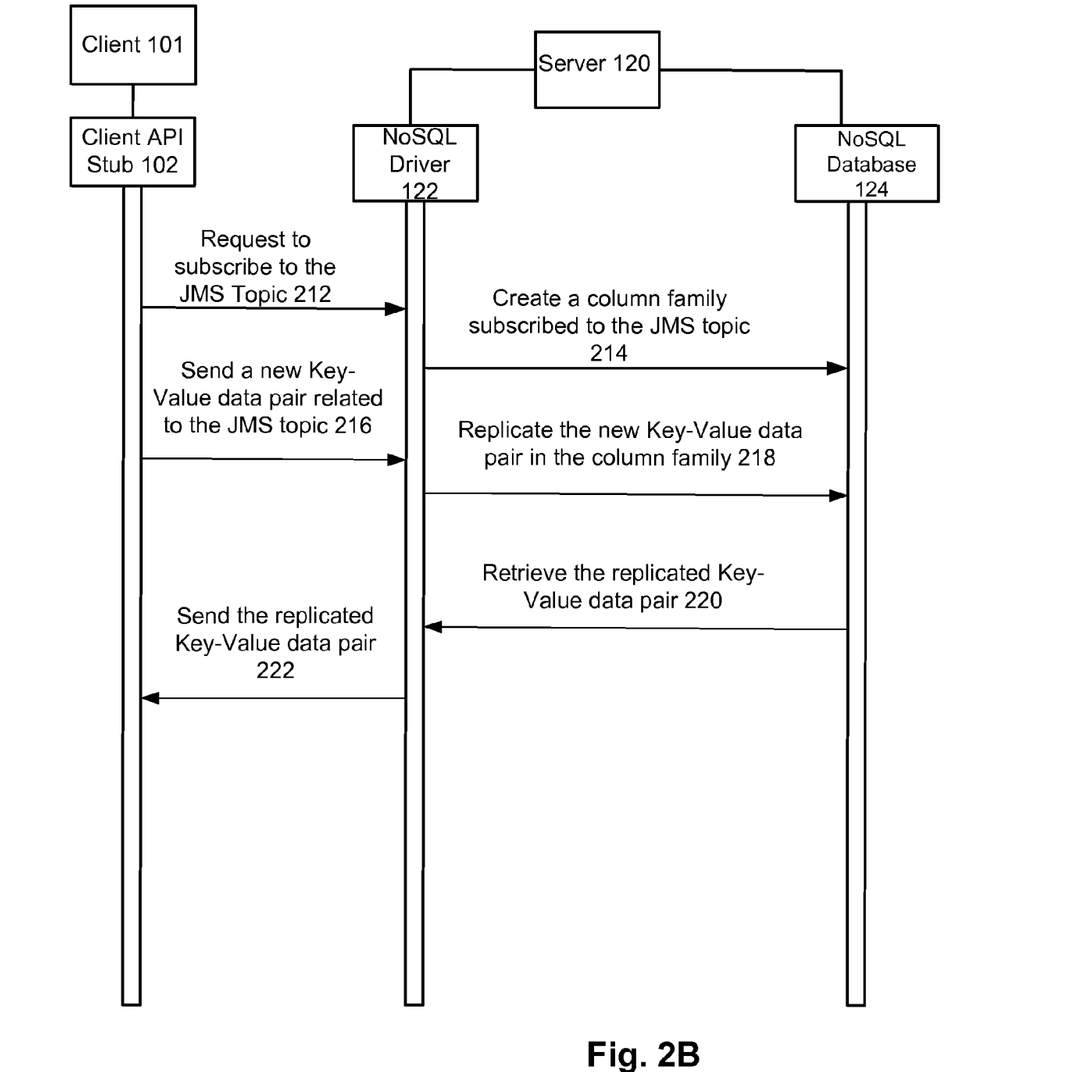
FIG. 2B illustrates an example of interactions between a client, and a Java server in accordance with some embodiments.

FIG. 2B is a communication flow diagram depicting interactions between a client 101 and the JMS sever 120 according to another embodiment of the disclosure. In one embodiment, the client 101 and the JMS server 120 are the same machines as described with respect to FIG. 1.

In one embodiment, the client API stub 102 of the client 101 sends a request 212 to subscribe to a JMS topic associated with the JMS messages to the NoSQL driver 122 of the JMS server 120. The NoSQL driver 122 creates 214 a column family subscribed to the JMS topic in the NoSQL database 124. In some embodiments, the NoSQL driver 122 creates a column family of the key-value data pairs in the NoSQL database 124 for the JMS topic. As discussed above, the column family subscribes the JMS topic for the client subscribed to the JMS topic.

In another embodiment, the client API stub 102 of the client 101 converts a new JMS message related to the JMS topic into a new key-value data pair related to the JMS topic and sends 216 the new key-value data pair related to the JMS topic to the NoSQL driver 122 of the JMS server 120. The NoSQL driver 122 replicates 218 the new key-value data pair in the column families in the NoSQL database 124 for all the clients subscribed to the JMS topic. The NoSQL driver 122 then retrieves 220 the replicated key-value data pair in the column family from the NoSQL database and automatically sends 222 the replicated key-value data pair to the client API stub 102 of the client 101 subscribed to the JMS topic. The client API stub 102 converts the replicated key-value data pair to the replicated JMS message to the clients 101 subscribed to the JMS topic.

Figure 3:
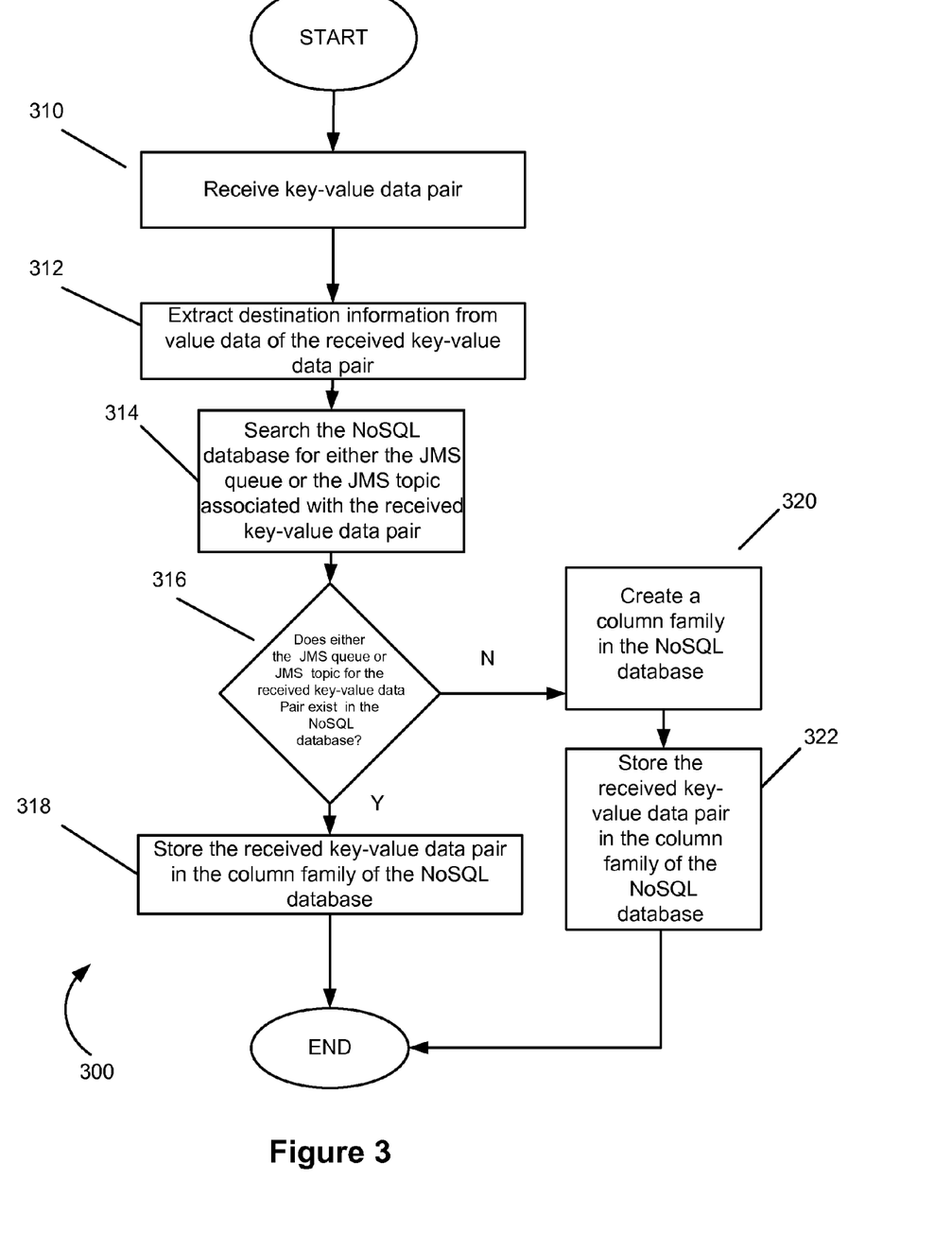
FIG. 3 is a flow diagram of one embodiment of a Java server-side method for providing message for Java message service.

FIG. 3 is a flow diagram illustrating a server-side method 300 for providing messages for JMS according to an embodiment of the disclosure. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by NoSQL driver 122 of JMS server machine 120 of FIG. 1.

Method 300 begins at block 310 where a key-value data pair is received by the NoSQL driver 122 of the JMS server 120 from the client 101. In one embodiment, the JMS server 120 receives the key-value data pair as part of a ordinary storage request. As discussed above, the key data of the received key-value data pair may include a timestamp of the JMS message. The value data of the received key-value data pair may include the destination information of the JMS message. The destination of the JMS message may include one of a JMS queue associated with the JMS message or a JMS topic associated with the message. As discussed above, the JMS queue is a data structure construct that represents one-to-one messaging (i.e., it supports point to point messaging). The JMS topic may include a distribution mechanism that represents publish/subscribe messaging for publishing JMS messages to a particular message topic that are delivered to multiple subscribers. At block 312, the NoSQL driver 122 of the JMS server 120 extracts the destination information from the value data of the received key-value data pair.

At block 314, the NoSQL driver 122 searches the NoSQL database 124 for either the JMS queue or the JMS topic associated with the received key-value data pair. As discussed above, the NoSQL database 124 stores a column family including a plurality of key-value data pairs. At block 316, the NoSQL driver 122 determines if either the JMS queue or the JMS topic associated with the received key-value data pair exists in the stored plurality of the key-value data pairs in the NoSQL database 124. If at block 316, it is determined that one of the JMS queue or JMS topic exists, then at block 318, the NoSQL driver 122 stores the received key-value data pair with the corresponding stored key-value data pairs in the column family of the NoSQL database 124. If at block 316, it is determined that the neither the destination queue nor the destination topic for the received key-value data pair exists, then at block 320, the NoSQL driver 122 creates a column family in the NoSQL database 124 for the received key-value data pair. At block 322, the NoSQL driver stores the received key-value data pair in the column family of the NoSQL database 124.

Figure 4:
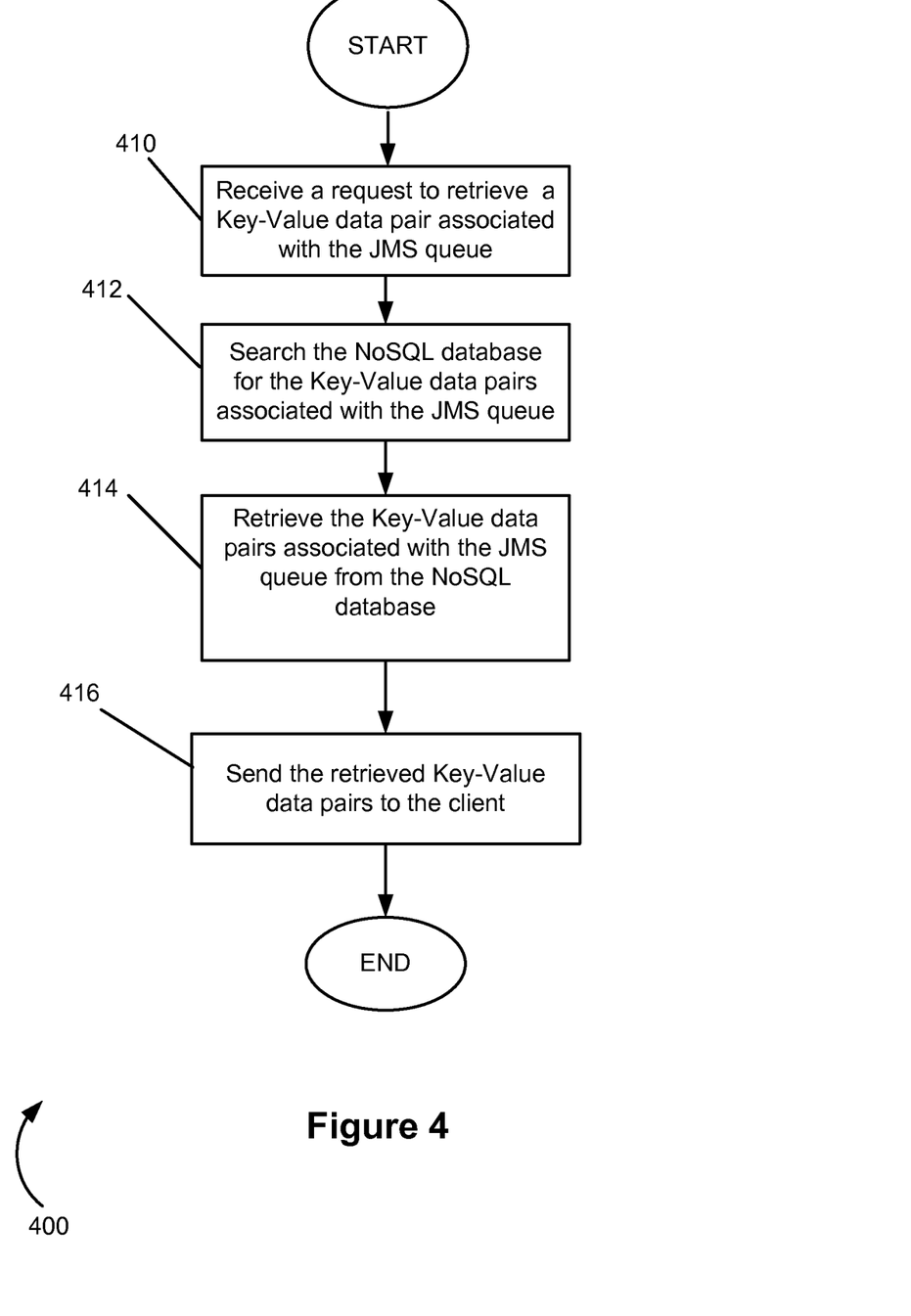
FIG. 4 is a flow diagram of one embodiment of a Java server-side method for providing message for Java message service.

FIG. 4 is a flow diagram illustrating a server-side method 400 for providing messages for JMS according to another embodiment of the disclosure. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the NoSQL driver 122 of FIG. 1.

Method 400 begins at block 410 where the NoSQL driver 122 of the JMS server 120 receives a request, from a client API stub 102 of the client 101, to retrieve key-value data pair associated with the JMS queue. At block 412, the NoSQL driver 122 searches the NoSQL database 124 for the key-value data pairs from the JMS queue. In one embodiment, the JMS queue is associated with the column family of the same name. At block 414, the NoSQL driver 122 retrieves the key-value data pairs from the JMS queue in the NoSQL database 124. At block 416, the NoSQL driver sends the retrieved key value to the client 101.

Figure 5:
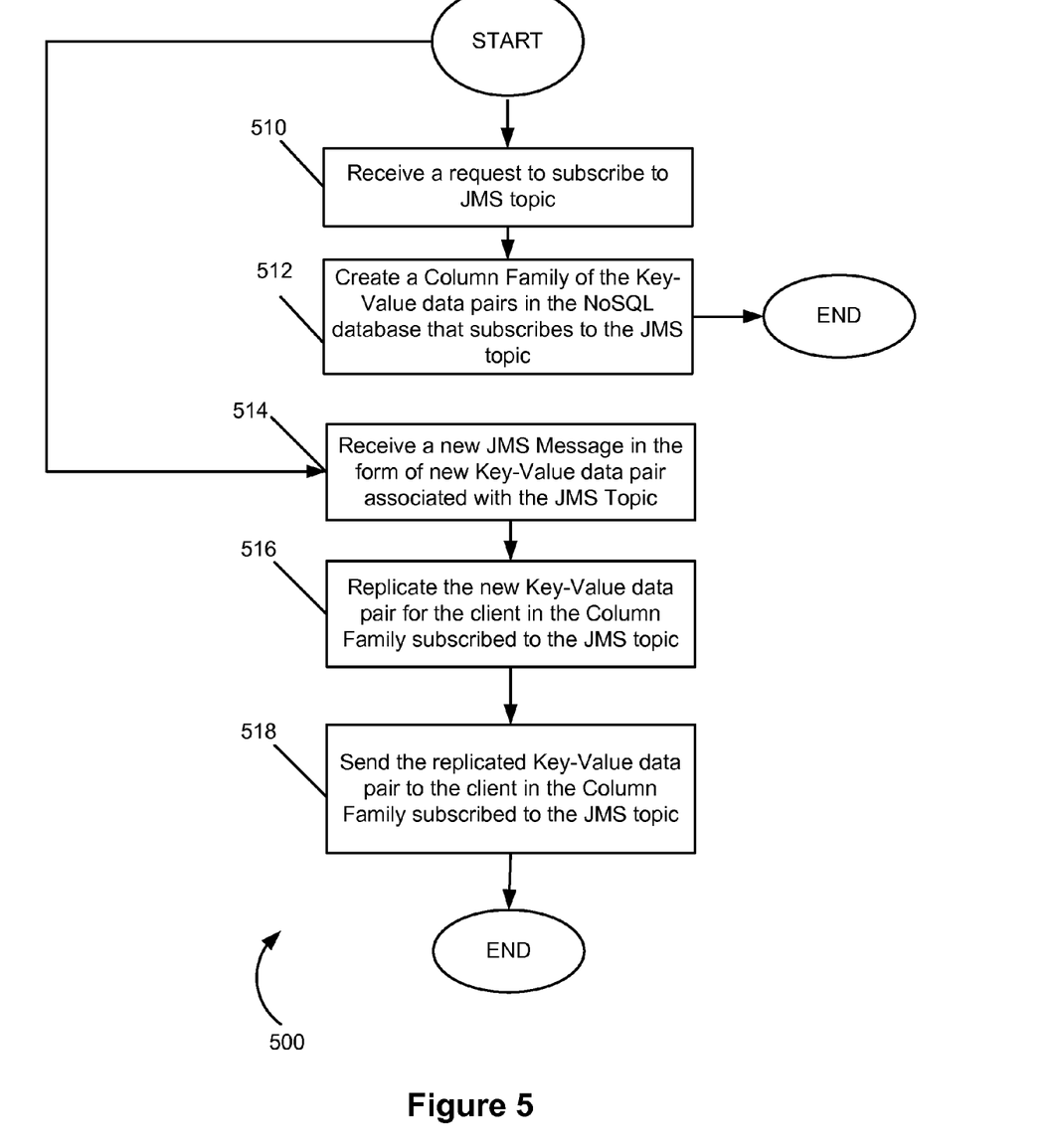
FIG. 5 is a flow diagram of one embodiment of a Java server-side method for providing message for Java message service.

FIG. 5 is a flow diagram illustrating a server-side method 500 for providing messages for JMS according to another embodiment of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by the NoSQL driver 122 of FIG. 1.

Method 500 begins at block 510 where the NoSQL driver 122 of the JMS server 120 receives, from a client 101, a request to subscribe to a JMS topic. As discussed above, the JMS topic represents publish/subscribe messaging for publishing JMS messages to a particular message topic that are delivered to multiple subscribers. Such JMS messages may be associated with JMS topics that exist in the column families of the key-value data pairs in the NoSQL database 124. At block 512, the NoSQL driver 122 creates a column family of the key-value data pairs in the NoSQL database 124 that subscribes to the JMS topic for the client subscribed to the JMS topic. As such, for each subscribed to the JMS topic, a column family is created for the JMS topic. At block 514, the NoSQL driver 122 receives a new JMS message in the form of new key-value data pair associated with the JMS topic. At block 516, the NoSQL driver 122 replicates the new key-value data pair for the the column family subscribed to the JMS topic. In some embodiments, a the new key-value data pair is replicated for all the column families subscribed to the JMS topic At block 518, the NoSQL driver 122 sends the replicated key-value data pair to to the client 101 of the column family subscribed to the JMS topic. In some embodiments, the NoSQL driver 122 sends the replicated key-value data pair to all the clients 101 of the column families subscribed to the JMS topic.

Figure 6:
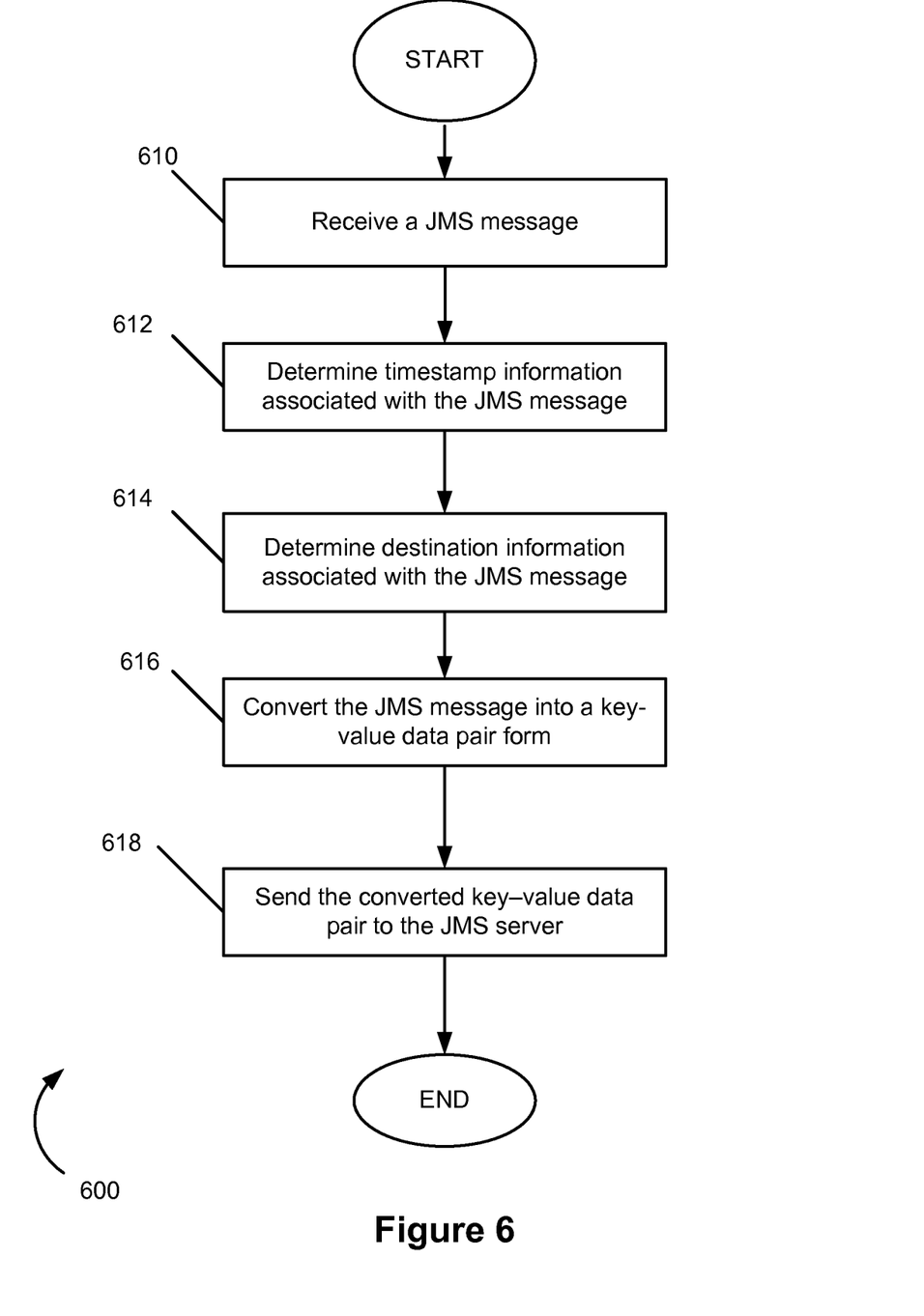
FIG. 6 illustrates a flow diagram of one embodiment of a client-side method for providing Java message service.

FIG. 6 is a flow diagram illustrating a client-side method 600 for providing messages for JMS according to another embodiment of the disclosure. Method 600 may be performed by processing logic that may comprise hardware (e.g., circuitry, dedicated logic, programmable logic, microcode, etc.), software (such as instructions run on a processing device), firmware, or a combination thereof. In one embodiment, method 600 is performed by the client API stub 102 of client device 101 of FIG. 1.

Method 600 begins at block 610, where the client API stub 102 of the client device 101 receives a JMS message. The client API stub 102 may generate the JMS message itself for transmission to a JMS server 120. At block 612, the client API stub 102 of the client 101 determines the timestamp information associated with the JMS message. At block 614, the client API stub 102 determines the destination information associated with the JMS message. At block 616, the client API stub 102 of the client 101 converts the JMS message into a key-value data pair form. As discussed above, key data may include the time stamp information of the JMS message representing, for example, the time when the JMS message was received by the client 101. Also, as discussed above, the value data include destination information of the JMS message. In one embodiment, the destination is a JMS queue of the JMS server 120. In other embodiment, the destination is a JMS topic of the JMS server 120. At block 618, the client API stub 102 sends the key-value data pair to the JMS server 120.

Figure 7:
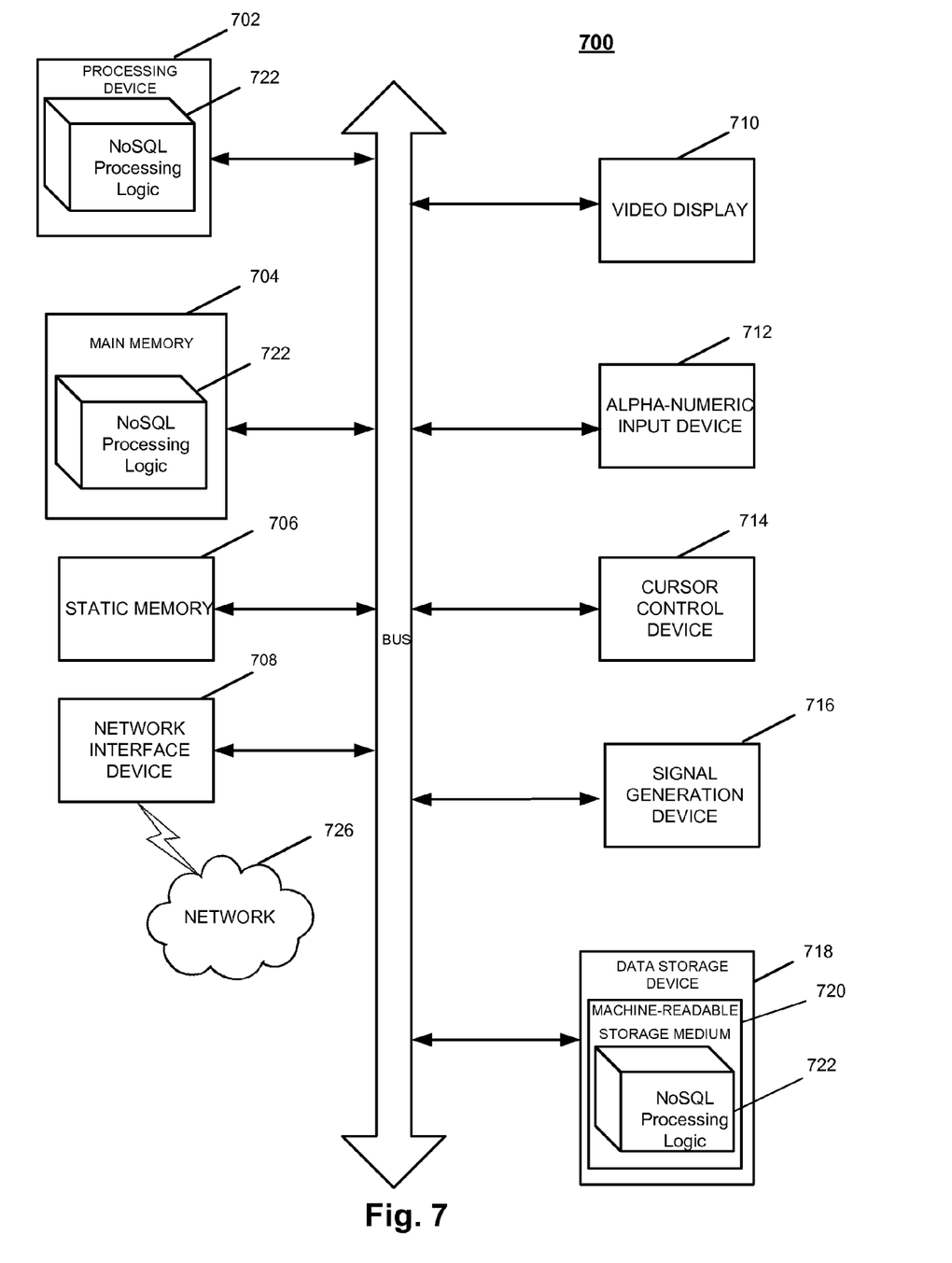
FIG. 7 illustrates a block diagram of one embodiment of a computer system.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) (such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute NoSQL processing logic 722 including the NoSQL driver 122 of FIG. 1 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium (or more specifically a computer-readable storage medium) 720 on which is stored one or more sets of instructions (e.g. NoSQL processing logic 722) embodying any one or more of the methodologies of functions described herein (e.g. NoSQL driver 122 of FIG. 1). The NoSQL processing logic 722 may also reside, completely or at least partially, within the main memory 704 and/or within the processing device 702 during execution thereof by the computer system 700; the main memory 704 and the processing device 702 also constituting machine-accessible storage media.

The machine-readable storage medium 720 may also be used to store the NoSQL processing logic 722 persistently. While the machine-accessible storage medium 720 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

In the following description, numerous details are set forth. It is apparent, however, to one skilled in the art, that the present disclosure may be practiced without these specific details. In some instances, well-known structures and devices are shown in block diagram form, rather than in detail, in order to avoid obscuring the present disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "extracting", "retrieving", "replicating", "creating", "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the specific method steps. The structure for a variety of these systems will appear as set forth in the description below. In addition, the present disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

It is to be understood that the above description is intended to be illustrative, and not restrictive. Many other embodiments will be apparent to those of skill in the art upon reading and understanding the above description. Although the present disclosure has been described with reference to specific examples of the embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
  receiving, by a processing device, a key-value data pair from a client;
  extracting, by the processing device, destination information of a JAVA™ message service (JMS) message from value data of the key-value data pair, wherein the destination information is one of a JMS queue or a JMS topic associated with the received key-value data pair; and
  when one of the JMS queue or the JMS topic associated with the received key-value data pair exists in a column family of not only structured query language (NoSQL) database of the JMS server, storing, by the processing device, the key-value data pair in the column family of the NoSQL database, wherein the column family comprising a plurality of stored key-value data pairs.

2. The method of claim 1, further comprising when one of the JMS queue or the JMS topic associated with the key-value data pair does not exists in the column family of the NoSQL database, creating a column family in the NoSQL database and storing the received key-value data pair in the column family.

3. The method of claim 1 wherein the JMS message is converted into the key-value data pair by the client.

4. The method of claim 1 wherein the JMS message is one of generated or received by the client.

5. The method of claim 1 further comprising
receiving a request to retrieve the key-value data pair associated with the JMS queue; and
retrieving the key-value data pair associated with the JMS queue, wherein the key-value data pair associated with the JMS queue is retrieved from the column family of the NoSQL database.

6. The method of claim 1, further comprising sending the retrieved key-value data pair associated with the JMS queue to the client.

7. The method of claim 1 further comprising receiving a request to subscribe to the JMS topic; and
creating a column family of the key-value data pairs in the NoSQL database, wherein the column family comprises the JMS topic for the client subscribed to the JMS topic.

8. The method of claim 7 further comprising:
receiving a second key-value data pair associated with the JMS topic; and
replicating the second key-value data pair in the column family of the NoSQL database subscribing to the JMS topic.

9. The method of claim 8, further compromising sending the replicated key-value data pair to the client subscribed to the JMS topic.

10. A system comprising:
a memory;
a processing device, operatively coupled to the memory, to:
receive, from a client, a key-value data pair;
extract destination information of a JAVA™ message service (JMS) message from value data of the key-value data pair, wherein the destination information is one of a JMS queue associated with the received key-value data pair; and
when one of the JMS queue or the JMS topic associated with the received key-value data pair exists in a column family of the NoSQL database, store the key-value data pair in the column family of the NoSQL database, wherein the column family comprising a plurality of stored key-value data pairs.

11. The system of claim 10 the processing device further to:
create a column family in the NoSQL database; and
store the received key-value data pair in the column family when one of the JMS queue or the JMS topic associated with key-value data pair does not exist in the NoSQL database.

12. The system of claim 10, the processing device further to:
receive a request to retrieve the key-value data pair associated with the JMS queue; and
retrieve the key-value data pair associated with the JMS queue, wherein the key-value data pair associated with the JMS queue is retrieved from the column family of the NoSQL database.

13. The system of claim 10 the processing device further to:
receive a request to subscribe to the JMS topic; and
create a column family of the key-value data pairs in the NoSQL database, wherein the column family comprises the JMS topic for the client subscribed to the JMS topic.

14. The system of claim 13, the processing device further to:
receive a second key-value data pair associated with the JMS topic; and
replicate the second key-value data pair in the column family of the NoSQL database subscribing to the JMS topic; and send the replicated key-value data pair to the client subscribed to the JMS topic.

15. A non-transitory machine-readable storage medium including instructions that, when accessed by a processing device, cause the processing device to:
receive a key-value data pair from a client;
extract destination information of a JAVA™ message service (JMS) message from value data of the key-value data pair, wherein the destination information is one of a JMS queue or a JMS topic associated with the received key-value data pair; and
when one of the JMS queue or the JMS topic associated with the received key-value data pair exists in a column family of not only structured query language (NoSQL) database of the JMS server, store the key-value data pair in the column family of the NoSQL database, wherein the column family comprising a plurality of stored key-value data pairs.

16. The non-transitory machine-readable storage medium of claim 15, the processing device further to:
when one of the JMS queue or the JMS topic associated with the key-value data pair does not exists in the column family of the NoSQL database, create a column family in the NoSQL database and store the received key-value data pair in the column family.

17. The non-transitory machine-readable storage medium of claim 15, the processing device further to:
receive a request to retrieve the key-value data pair associated with the JMS queue; and
retrieve the key-value data pair associated with the JMS queue, wherein the key-value data pair associated with the JMS queue is retrieved from the column family of the NoSQL database.

18. The non-transitory machine-readable storage medium of claim 15, the processing device further to:
receive a request to subscribe to the JMS topic; and
create a column family of the key-value data pairs in the NoSQL database, wherein the column family comprises the JMS topic for the client subscribed to the JMS topic.

19. The non-transitory machine-readable storage medium of claim 18, the processing device further to:
receive a second key-value data pair associated with the JMS topic; and
replicate the second key-value data pair in the column family of the NoSQL database subscribing to the JMS topic.

* * * * *